United States Patent [19]

Auld et al.

[11] 4,411,782

[45] Oct. 25, 1983

[54] MECHANICAL MEANS FOR SECURING A SCREEN HOLDING CAULKING IN A GROOVE AND METHODS

[75] Inventors: David L. Auld, Port Neches; Herbert W. Miller, Beaumont, both of Tex.

[73] Assignee: Texaco Inc., White Plains, N.Y.

[21] Appl. No.: 303,736

[22] Filed: Sep. 21, 1981

Related U.S. Application Data

[62] Division of Ser. No. 106,785, Dec. 26, 1979, Pat. No. 4,307,503.

[51] Int. Cl.³ ............................................. B01D 25/00
[52] U.S. Cl. .................................. 210/230; 210/450; 210/486; 210/541
[58] Field of Search ............... 210/230, 231, 450, 486, 210/541, 547

[56] References Cited

U.S. PATENT DOCUMENTS

| | | | |
|---|---|---|---|
| 549,896 | 11/1895 | Bushnell | 210/230 X |
| 1,231,662 | 1/1918 | Hettinger | 210/486 X |
| 1,801,662 | 4/1931 | Crutcher et al. | 210/541 X |
| 1,937,486 | 11/1933 | Demers | 29/148 |
| 2,023,910 | 12/1935 | Bacheldor | 210/486 |
| 2,732,949 | 1/1956 | Ziegenbusch | 210/149 |
| 3,206,216 | 9/1965 | Crook | 277/23 |
| 3,422,958 | 1/1969 | Newman | 210/333 |
| 3,643,803 | 2/1972 | Glos | 210/486 X |
| 3,669,267 | 6/1972 | Hutton | 210/231 X |
| 3,875,065 | 4/1975 | Rosenblum | 210/388 |

OTHER PUBLICATIONS

Chemical Engineers' Handbook by Perry et al, Fourth Edition, McGraw Hill Book Co. of New York, pp. 23-6, 23-7 and 23-12.

Primary Examiner—John Adee
Attorney, Agent, or Firm—Robert A. Kulason; Theron H. Nichols; Richard A. Morgan

[57] ABSTRACT

A mechanical or attachment holder and support means for securing a spline driven in a groove for holding down a flexible sheet or filter screen under continually changing temperatures and high pressures comprises, a plurality of 90° angle clips in axial alignment on the spline extending around the periphery of the filter screen with one leg of the clip pressing the spline down and the clip other leg being positioned against a longer side of the groove, and screw inserted through the 90° clip bisecting the 90° angle between of the clip legs for securely fastening the spline and the filter screen under the spline securely to a filter screen holder for resisting the environmental conditions of continually changing temperatures between 200° and 250° F. under a minimum pressure of 200 psi for thus increasing the service life of the filter screen securing means or holder and support, for increasing run operating time on the filter screen, for decreasing filter screen maintenance, and for retaining the spline in the groove for the life of the spline.

6 Claims, 2 Drawing Figures

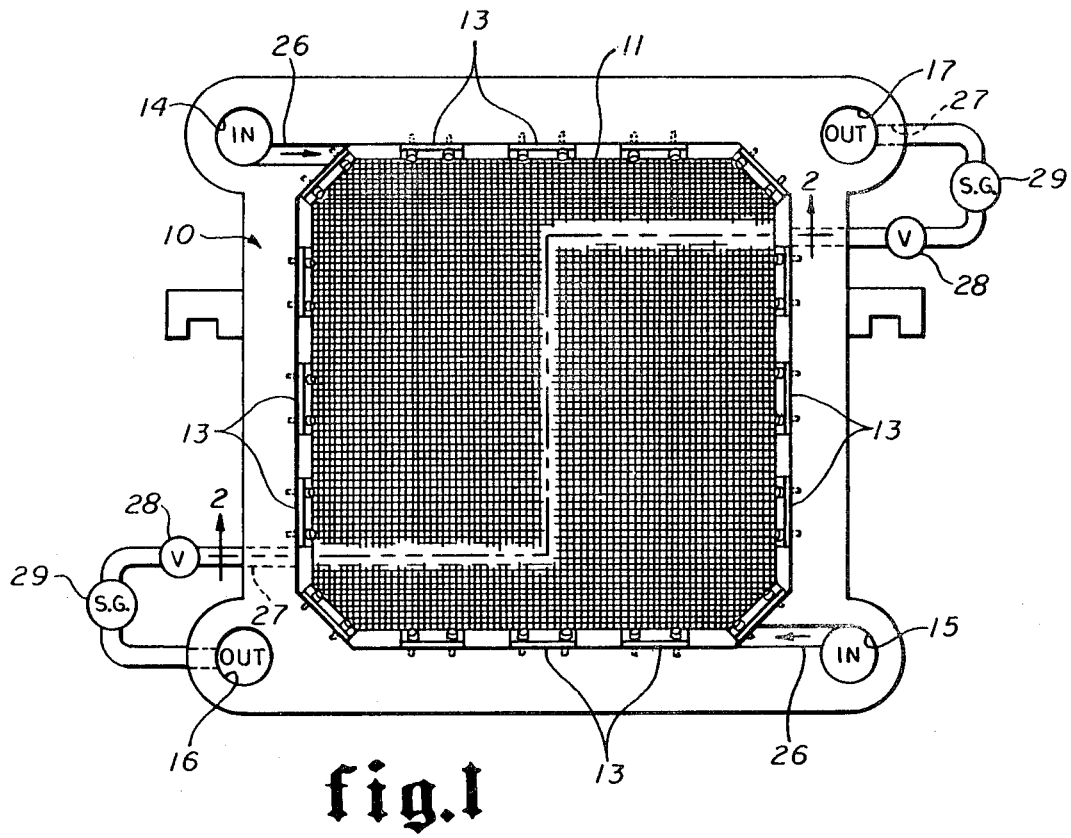
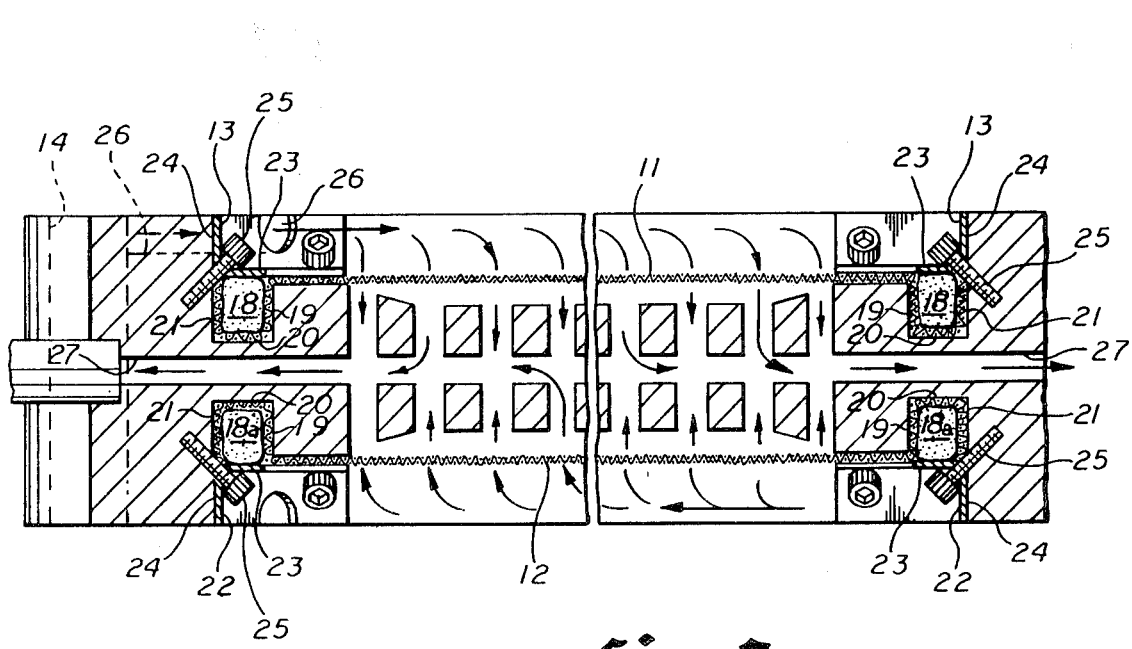

MECHANICAL MEANS FOR SECURING A SCREEN HOLDING CAULKING IN A GROOVE AND METHODS

This is a division, of application Ser. No. 106,785, filed Dec. 26, 1979, now U.S. Pat. No. 4,307,503.

BACKGROUND OF THE INVENTION

This invention pertains to a mechanical means for preventing caulking and a flexible material as a filter screen, held down by the caulking from popping out of a groove in a flexible material or filter screen holder, particularly under the severe environmental conditions of continually changing temperatures between 200° and 250° F. under a minimum pressure of 200 psi.

This invention produced a vast and unobvious improvement over many prior trial runs. Various elastomers were tried, but all deteriorated rapidly. When trying glass filled Teflon caulking, the product would cause the glass to leach out of the glass filled Teflon. Various rubbers were utilized, but they all hardened eventually and were unsuccessful. Finally the disclosed mechanical means was discovered for retaining the caulking in the groove under the severe environmental conditions.

OBJECTS OF THE INVENTION

Accordingly, a primary object of this invention is to provide a method for securing a flexible sheet holding caulking driven in a groove having one side substantially higher than the other side in the peripheral edge of a flexible sheet holder.

Another primary object of this invention is to provide a mechanical means for securing a flexible sheet securing caulking driven in a groove on top of the edge of the flexible sheet.

A further object of this invention is to provide a mechanical means that will secure a flexible sheet securing caulking driven in a groove on top of the peripheral edge of the flexible sheet that will withstand continually changing temperatures between 200° and 250° F. under a minimum pressure of 200 psi for the life of the caulking for thus increasing the service life of the mechanical flexible sheet securing means, for increasing run operating time on the flexible sheet, for decreasing flexible sheet maintenance, and for retaining the caulking for the life of the caulking.

A further object of this invention is to provide both a method and a mechanism for securing a flexible sheet holding caulking driven in a groove in a flexible sheet holder, each of which is easy and simple to operate, and the latter is of simple configuration, is economical to build and assemble, and both provide greater efficiency for the caulking securing function.

Other objects and various advantages of the disclosed method and mechanical means for securing a flexible sheet holding caulking driven in a groove will be apparent from the following detailed description, together with the accompanying drawings, submitted for purposes of illustration only and not intended to define the scope of the invention, reference being made for that purpose to the subjoined claims.

BRIEF DESCRIPTION OF THE DRAWINGS

The drawings diagrammatically illustrate by way of example, not by way of limitation, one form of the invention wherein like reference numerals designate corresponding parts in the several views in which:

FIG. 1 is a schematic diagrammatic front vertical view of a flexible sheet secured in a flexible sheet holder with the inventive mechanical clip means; and FIG. 2 is an enlarged detailed sectional view taken at 2—2 on FIG. 1.

The invention disclosed herein, the scope of which being defined in the appended claims is not limited in its application to the details of construction and arrangement of parts shown and described, since the invention is capable of other embodiments and of being practiced or carried out in various other ways. Also, it is to be understood that the phraseology or terminology employed here is for the purpose of description and not of limitation. Further, many modifications and variations of the invention as hereinbefore set forth will occur to those skilled in the art. Therefore, all such modifications and variations which are within the spirit and scope of the invention herein are included and only such limitations should be imposed as are indicated in the appended claims.

DESCRIPTION OF THE INVENTIONS

This patent includes two inventions, a method for securing a flexible sheet holding caulking driven in a groove in the peripheral edge of a flexible sheet holder and a mechanism for practicing the above method.

The basic method comprises,
(1) covering the outer surface of the caulking of one leg of a 90° angle clip,
(2) covering the higher side of the groove with the other leg of the 90° angle clip,
(3) fastening the 90° angle clip on top of the caulking with screw means inserted through the 90° angle clip bisecting the clip 90° angle for securing the screen securing caulking driven in the groove for fastening the caulking and the flexible sheet under the caulking securely to the screen holder and
(4) forming all of the 90° angle clips and screw means to withstand continually changing temperatures between 200° and 250° F. under a minimum pressure of 200 psi for the life of the caulking for thus increasing the surface life of the mechanical screen securing means, for increasing run operating time on the flexible sheet, for decreasing flexible sheet maintenance, and for retaining the caulking for the life of the caulking.

The first step of the above method may be expanded into greater detail as thus,
(1) positioning the 90° angle clip one leg in firm contact with the caulking in the groove prior to being secured in position for ensuring no movement of the caulking outwardly from the groove under the continually changing environmental conditions.

The second method step of the above basic method may be expanded further thus,
(1) positioning the 90° angle clip of the leg in firm contact with the groove higher side prior to being secured in position for ensuring no movement of the caulking outwardly from the groove under the continually changing environmental conditions.

The third method step of the above basic method may be expanded as follows,
(1) maintaining the 90° angle clip pressed against both the caulking and the groove higher side with the securing of the screw means therein the 90° angle clip.

The fourth method step of the above basic method may be elaborated and expanded as follows, (1) heat treating all of the 90° angle clips and screw means to withstand the continually changing temperatures between 200° and 250° F. under a minimum pressure of 200 psi for the life of the caulking.

THE PREFERRED EMBODIMENT FOR PRACTICING THE INVENTION

The above methods for securing a flexible sheet holding caulking driven in a groove in the peripheral edge of a flexible sheet holder may be performed by other mechanisms than that disclosed in FIGURES. The mechanism disclosed herein may be operated by other methods than those disclosed, as by hand. Also the disclosed mechanism can be used to practice another and materially different method. However, the preferred system for performing the method is disclosed in the FIGS. 1–2.

While various devices may be utilized for carrying out or practicing the inventive methods, FIGS. 1-2 illustrate at least one inventive apparatus for practicing the methods described above.

FIGS. 1-2 disclose a flexible sheet holder 10. FIG. 1 also discloses a flexible sheet 11, as of Teflon or Stainless Steel, the latter being preferable for example, held on the flexible sheet holder 10 with clips 13. These clips 13 are arranged in tandem order around the periphery of the flexible sheet which is also around the periphery of the flexible sheet holder 10.

FIG. 1 discloses further two fluid inlets 14 and 15 for introducing fluid into the flexible sheet holder 10. Two fluid outlets 16 and 17 are illustrated in FIG. 1 for passing the fluid from within the flexible sheet holder 10 to the outside thereof.

FIG. 2 shows a detailed view taken at 2—2 on FIG. 1. Here two screens 11 and 12 are illustrated secured to the two respective sides of the flexible sheet holder 10. The screens 11 and 12 are held taut over the end face of each of the respective opposite sides of the flexible sheet holder 10 for filtering the hot fluid passing from fluid inlet 14 and 15 through the two screens to inside of the flexible sheet holder 10 for passage externally on each edge of the flexible sheet holder.

The novel feature of the disclosed invention is the means for holding the caulking or spline 18 in the groove 19 for holding the peripheral edge of the flexible sheet in the groove so that the caulking 18 will not be pulled out by the force of the liquids passing through the screen which tends to pull the caulking out of the grooves. This is particularly true when the fluid is passing through the screen at continually varying temperatures between 200° F. and 250° F. at pressures of a minimum of 200 psi.

While FIG. 2 shows a sectional view of two caulkings 18 and 18a on the flexible sheet holder, only one caulking, 18, will be described for clarity of the disclosure. FIG. 2 shows a groove 19 extending around the periphery of the flexible sheet holder and formed with two sides, the shorter side 20 and the longer side 21. A 90° angle clip 13 is formed with two legs, leg 23 being formed for pressing on the caulking or spline 18 and 90° thereto is the other leg 24 for pressing against the longer side 21 of the groove 19. A screw means 25 bisects the 90° angle between the two legs 23 and 24 of the 90° angle clip 13. Screw means 25 is screwed into a threaded hole extending through the longer side 21 of the groove and on into the flexible sheet holder. A portion of the clip may be field ground away to allow fluid passage across the vertical edge of the clips at the inlet ports. As screw means 25 is tightened down, the leg 23 of the 90° angle clip is pressed against the caulking or spline 18 and the leg 24 of the 90° angle clip is pressed against the longer side 21 of the groove 19. Between the caulking or spline 18 and the groove 19 is the peripheral edge of the flexible sheet material 11, as a filter screen in this example, for being fixedly secured in the groove 19 in the peripheral edge of the flexible sheet holder 10.

Thus in operation the fluid passes from the inlet 14 through the screen 11 to the interior of the flexible sheet holder and then passes laterally outwardly to exit therefrom. Fluid flows similarly through the screen 12.

A typical full size operating embodiment illustrated in FIGS. 1-2 comprises 90° angle clips and screw means securing the clips down in position. The 90° angle clips are 316 Stainless Steel clips 8 inches long (203 mm) $\frac{1}{2}"\times\frac{1}{2}"$ (13 mm × 13 mm) and 1/16" (1.6 mm) thick with two holes therein for fastening screws. The 90° angle clips are spaced apart about 2" (59 mm) and are field ground down only in front of each inlet flow channel, as channel 26 from fluid inlet 14. The caulking is pure Teflon with no glass or the like mixed therein. The screw means are carbon steel $\frac{1}{4}"$—20 socket head cap screws for insertion into previously drilled and tapped holes in the filter screen holder. Each outlet flow channel, as 27 to the outlet port 16 has a valve 28 and a slight glass 29 therein. Each of the filter screens per se are made of 316 Stainless Steel, (24 × 110 Dutchweave).

Obviously other methods may be utilized for securing a flexible sheet holding caulking driven in a groove with the embodiment of FIGS. 1-2 than those listed above depending on the particular caulking desired to be driven in a groove.

Accordingly, it will be seen that the above disclosed methods and the above described mechanical means will operate in a manner which meets each of the objects set forth hereinbefore.

While only a few methods of the invention and one mechanism for carrying out the methods have been disclosed, it will be evident that various other methods and modifications are possible in the arrangement and construction of the disclosed methods and mechanical means for securing a flexible sheet (as a filter screen) holding caulking driven in a groove in the peripheral edge of the flexible sheet without departing from the scope of the invention and it is accordingly desired to comprehend within the purview of this invention such modifications as may be considered to fall within the scope of the appended claims.

We claim:

1. Mechanical means for securing a flexible sheet splined into a peripherally grooved flexible sheet holder, said mechanical means being positioned over said spline about a peripheral edge, said groove having one side substantially longer than the other side thereof, wherein
   (a) a flexible sheet holder has a groove formed in the end face thereof for securing a flexible sheet therein,
   (b) clip means of a predetermined length having legs angled to each other with one leg in direct contact with the outer surface of the spline, (c) the other leg of said clip means being positioned against and in direct contact with the longer side of said groove, and (d) screw means inserted transversely of said groove through said clip means and obliquely to each clip leg for securely fastening said clip means to the longer side of said groove in the end face of said flexible sheet holder for fastening the spline to the flexible sheet holder for resisting environmental conditions of continually changing temperatures to thus increase the service life of said flexible sheet by decreasing flexible sheet maintenance.

2. A mechanical means as recited in claim 1 wherein, (a) said clip means comprises a plurality of angle clips in axial alignment with each other, and (b) each angle clip being of a predetermined length.

3. A mechanical means as recited in claim 1 or 2 wherein, (a) all of said angle clips and fastening means forming the mechanical means can withstand continually changing temperatures between 200° and 250° F. under a minimum pressure of 200 psi for the life of said spline.

4. A mechanical means as recited in claim 1 wherein, (a) said flexible sheet is a filter screen, and (b) said flexible sheet holder is a filter leaf.

5. Mechanical means for securing a flexible sheet securing spline driven in a groove over the peripheral edge of the flexible sheet in each of at least two sides of the end face of a flexible sheet holder, each of the two grooves having a side substantially longer than the other side of the respective groove wherein, (a) Stainless Steel clip means of a predetermined length having two legs at an angle to each other being positioned with one leg in contact with the outer surface of a spline in a groove on each of the two sides of the end face of a flexible sheet holder, (b) the other leg of each of said clip means being positioned against the longer side of said groove on each of the two sides of said flexible sheet holder, (c) carbon steel screw means inserted transversely to the groove through each of said Stainless Steel clip means and substantially bisecting the angle between the two legs for securely fastening said clip means to the two sides of said flexible sheet holder and for securely fastening said spline and a flexible sheet thereunder to both sides of said flexible sheet holder, and (d) all of said Stainless Steel clip means and said carbon steel screw means being resistant to continually changing temperatures between 200° and 250° F. under a minimum pressure of 200 psi for increasing the service life of said spline securing means, for increasing the run operating time of said flexible sheet, and for decreasing flexible sheet maintenance.

6. Mechanical means as recited in claims 1 or 5 where said Stainless Steel clip means comprises, (a) a plurality of axially spaced apart angle clip means extending around the peripheral edge of each flexible sheet for securing said flexible sheet adjacent the peripheral edge of said end face of said flexible sheet holder.

* * * * *

UNITED STATES PATENT AND TRADEMARK OFFICE
CERTIFICATE OF CORRECTION

PATENT NO. : 4,411,782
DATED : December 30, 1983
INVENTOR(S) : David Lawrence Auld and Herbert W. Miller It is certified that error appears in the above-identified patent and that said Letters Patent are hereby corrected as shown below:

Claim 3, line 3, "fastening" should be corrected to read --screw--

Signed and Sealed this

Twenty-eighth Day of February 1984

[SEAL]

Attest:

GERALD J. MOSSINGHOFF

Attesting Officer

Commissioner of Patents and Trademarks